United States Patent
Ohnishi et al.

(10) Patent No.: US 9,291,857 B2
(45) Date of Patent: Mar. 22, 2016

(54) LIQUID CRYSTAL DISPLAY DEVICE

(75) Inventors: Yasuyuki Ohnishi, Osaka (JP); Masanobu Mizusaki, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 151 days.

(21) Appl. No.: 14/234,122

(22) PCT Filed: Jul. 27, 2012

(86) PCT No.: PCT/US2012/069080
§ 371 (c)(1),
(2), (4) Date: Jan. 21, 2014

(87) PCT Pub. No.: WO2013/018668
PCT Pub. Date: Feb. 7, 2013

(65) Prior Publication Data
US 2014/0139794 A1    May 22, 2014

(30) Foreign Application Priority Data

Aug. 4, 2011 (JP) .................. 2011-171138

(51) Int. Cl.
*G02F 1/1337* (2006.01)
*G02F 1/1343* (2006.01)
(Continued)

(52) U.S. Cl.
CPC .......... *G02F 1/133711* (2013.01); *C08F 2/001* (2013.01); *C09K 19/2014* (2013.01);
(Continued)

(58) Field of Classification Search
CPC .............. C09K 19/2014; C09K 19/54; C09K 2019/0448; C09K 2019/548; G02F 1/133788; G02F 1/133711; G02F 1/134363; G02F 1/133707; G02F 2001/134372; G02F 2001/13706; G02F 2001/13712
See application file for complete search history.

(56) References Cited

U.S. PATENT DOCUMENTS

| 9,036,119 | B2* | 5/2015 | Mizusaki et al. ............. 349/123 |
| 9,068,324 | B2* | 6/2015 | Linder et al. |
| 2003/0231272 | A1 | 12/2003 | Nakamura et al. |
| 2005/0264737 | A1 | 12/2005 | Kataoka et al. |
| 2006/0055858 | A1 | 3/2006 | Nakanishi et al. |
| 2007/0206129 | A1 | 9/2007 | Nakamura et al. |
| 2011/0043729 | A1 | 2/2011 | Nakanishi et al. |

(Continued)

FOREIGN PATENT DOCUMENTS

| CN | 1355443 | 6/2002 |
| CN | 1462898 | 12/2003 |

(Continued)

OTHER PUBLICATIONS

International Search Report for corresponding PCT Application No. PCT/JP2012/069080, mailed Sep. 25, 2012 (with English language translation).

*Primary Examiner* — Shean C Wu
(74) *Attorney, Agent, or Firm* — Greer Burns & Crain, Ltd.

(57) ABSTRACT

Provided is a liquid crystal display device reducing display unevenness and image sticking even though employing a PSA polymerization step in which monomers are added to a liquid crystal layer. The liquid crystal display device includes a pair of substrates, at least one of the substrates including an alignment film and a structure consisting of an organic insulating material; a polymer layer that is formed on the alignment film to control the alignment of liquid crystal molecules; and a liquid crystal layer containing a liquid crystal material, the layer being placed between the pair of substrates, wherein the polymer layer is formed by polymerization of one or more kinds of radical polymerizable monomers contained in the liquid crystal layer, and at least one kind of the radical polymerizable monomers includes a structure which generates radicals through self-cleavage reaction by light irradiation and two or more radical polymerizable groups.

20 Claims, 3 Drawing Sheets

(51) Int. Cl.
*G02F 1/137* (2006.01)
*C09K 19/20* (2006.01)
*C09K 19/54* (2006.01)
*C09K 19/32* (2006.01)
*C08F 2/00* (2006.01)
*G02F 1/1333* (2006.01)
*G02F 1/13* (2006.01)
*C09K 19/04* (2006.01)

(52) U.S. Cl.
CPC ............... *C09K19/322* (2013.01); *C09K 19/54* (2013.01); *G02F 1/133788* (2013.01); *C09K 2019/0448* (2013.01); *C09K 2019/548* (2013.01); *G02F 1/133707* (2013.01); *G02F 1/134363* (2013.01); *G02F 2001/1316* (2013.01); *G02F 2001/13706* (2013.01); *G02F 2001/13712* (2013.01); *G02F 2001/133397* (2013.01); *G02F 2001/134372* (2013.01)

(56) References Cited

U.S. PATENT DOCUMENTS

| | | | |
|---|---|---|---|
| 2011/0095229 | A1 | 4/2011 | Lee et al. |
| 2012/0177847 | A1 | 7/2012 | Nakamura et al. |
| 2012/0261846 | A1 | 10/2012 | Nakanishi et al. |
| 2012/0262657 | A1 | 10/2012 | Nakanishi et al. |

FOREIGN PATENT DOCUMENTS

| | | |
|---|---|---|
| JP | 2004-286984 | 10/2004 |
| JP | 2005-338613 | 12/2005 |
| JP | 2006-078968 | 3/2006 |
| JP | 2011-525553 | 9/2011 |
| WO | WO 2009/156118 | 12/2009 |
| WO | WO 2010/116564 | 10/2010 |
| WO | WO 2012/105479 | 8/2012 |

\* cited by examiner

LIQUID CRYSTAL DISPLAY DEVICE

This application is the U.S. national phase, filed under 35 U.S.C. §371, of International Application No. PCT/JP2012/069080, filed Jul. 27, 2012, which claims priority to Japanese Patent Application No. 2011-171138, filed Aug. 4, 2011, the entire contents of both are incorporated by reference herein.

TECHNICAL FIELD

The present invention relates to a liquid crystal display device. More specifically, the present invention relates to a liquid crystal display device in which a polymer layer is formed on an alignment film to enhance the alignment-control capability of liquid crystals.

BACKGROUND ART

Liquid crystal display devices, having advantages in the thin profile, light weight, and low power consumption, are widely used as display devices such as televisions, personal computers, and PDAs. Particularly in recent years, liquid crystal display devices have been rapidly increased in size as seen in liquid crystal display devices for televisions.

Pretilt angle imparting technology using a polymer (hereinafter, also referred to as a PSA (Polymer Sustained Alignment: alignment maintaining) layer) to achieve high luminance and high-speed response has been drawing attention recently (see, for example, Patent Literatures 1, 2). In the PSA technology, a liquid crystal composition prepared by mixing liquid crystals with polymerizable components such as monomers and oligomers is sealed between substrates. Then, the polymerizable components are polymerized into a polymer while a voltage is applied between the substrates to tilt liquid crystal molecules. Thereby, the liquid crystals have the prescribed pretilt angles even after elimination of applied voltage, and thus the alignment direction of the liquid crystals may be defined. The polymerizable components are polymerized by irradiation with heat or light (ultraviolet rays). The PSA technology may achieve high-speed response without reducing an aperture ratio.

CITATION LIST

Patent Literature

Patent Literature 1: JP 2004-286984 A
Patent Literature 2: JP 2006-78968 A

SUMMARY OF INVENTION

Technical Problem

However, the present inventors conducted investigations and found that even though known PSA technology can form a polymer layer for maintaining the alignment-control capability on an alignment film by injecting a liquid crystal layer composition that contains a liquid crystal material, a polymerizable monomer, and a polymerization initiator between a pair of substrates, and causing a polymerization reaction under determined conditions, it may deteriorate the display quality. Specifically, it may cause display unevenness and image sticking after long-time display of a same pattern.

Ultraviolet rays irradiation is typically employed to polymerize monomers in a liquid crystal layer. Long-time ultraviolet rays irradiation, however, tends to deteriorate structures constituting a liquid crystal display device, and thereby tends to lower the display quality. Among the structures, easily deteriorated are alignment films and dielectric protrusions that control the alignment of liquid crystals and interlayer insulation films that isolate wirings, electrodes, and the like because both of the alignment films and the interlayer insulation films often contain organic insulating materials.

Meanwhile, short-time ultraviolet rays irradiation for avoiding the deterioration causes unpolymerized monomers to remain in a liquid crystal layer, which causes quality deterioration such as image sticking. Thus, it is necessary to investigate a method of proceeding polymerization by short-time ultraviolet rays irradiation. Effective examples of this include adding a polymerization initiator represented by the following chemical formula (9).

[Chem. 1]

(9)

Such a polymerization initiator, however, hardly achieves 100% reaction efficiency. According to the investigations by the present inventors, electrically charged substances (e.g. ions, radical generators) remain after a PSA polymerization step, which presumably deteriorates the display quality. Specifically, substances such as unreacted monomers and polymerization initiators still remain in a liquid crystal layer even after a series of polymerization reactions. If unreacted monomers and polymerization initiators, which are easily charged, remain in a liquid crystal layer, charge transfers to other substances easily occur to generate ionic impurities in the following production steps or in typical use. This easily causes display unevenness and image sticking.

The present invention has been made under the current situation and aims to provide a liquid crystal display device reducing display unevenness and image sticking even though employing a PSA polymerization step in which monomers are added to a liquid crystal layer.

Solution to Problem

The present inventors conducted various investigations and focused on the components in a liquid crystal layer after polymerization reaction. They found that using a monomer that can serve as an initiator as a monomer for a PSA polymerization step may prevent residual unreacted monomers and polymerization initiators in a liquid crystal layer even by short-time ultraviolet rays irradiation, and may reduce deterioration of the components containing organic insulating materials. This can impressively solve the above problems, and thereby completing the present invention.

That is, an aspect of the present invention is a liquid crystal display device, including: a pair of substrates, at least one of the pair of substrates including an alignment film and a structure consisting of an organic insulating material, a polymer layer that is formed on the alignment film to control the alignment of liquid crystal molecules, and a liquid crystal layer containing a liquid crystal material, the liquid crystal layer being placed between the pair of substrates, wherein the polymer layer is formed by polymerization of one or more kinds of radical polymerizable monomers contained in the liquid crystal layer, and at least one kind of the radical polymerizable monomers is a compound including a structure which generates radicals through self-cleavage reaction by light irradiation and two or more radical polymerizable groups.

One of the pair of substrates is used as an array substrate, and the other is used as a color filter substrate, for example. The array substrate includes a plurality of pixel electrodes, and thereby individually controlling the alignment of liquid crystals in each pixel. The color filter substrate includes color filters with a plurality of colors, arranged to be superimposed with respective pixel electrodes on the array substrate. This enables individually controlling display color in each pixel.

At least one of the pair of substrates includes a structure consisting of an organic insulating material. The structure consisting of an organic insulating material means a structure including an organic compound with insulation properties as a material. The shape of the structure is not particularly limited and may be a film, a protrusion, or other shapes. Specific examples include a dielectric protrusion to control the alignment of the liquid crystal molecules that are adjacent to the dielectric protrusion, and an interlayer insulation film formed between a supporting substrate (e.g. glass substrate) and the alignment film. The structure consisting of an organic insulating material is photoreactive. Thus, it is deteriorated by ultraviolet rays irradiation in forming a polymer layer mentioned below, and may cause display unevenness and image sticking.

At least one of the pair of substrates further includes an alignment film. The alignment film of the present invention may be or may not be subjected to alignment treatment. If alignment treatment is performed, examples of the method thereof include rubbing treatment and photo-alignment treatment. The alignment film contains, as a main component, a polymer compound such as polyimide, polyamic acid, polyamide, or polysiloxane. If the alignment film is a photo-alignment film, preferable examples of a photo-alignment film material include a polymer compound that contains a photoreactive functional group such as a cinnamate group, a chalcone group, a coumarin group, a tran group, a stilbene group, or an azobenzene group.

At least one of the pair of substrates includes a polymer layer that is formed on the alignment film and controls the alignment of liquid crystal molecules. The polymer layer is formed by polymerization of one or more kinds of radical polymerizable monomers contained in a liquid crystal layer. Forming the polymer layer may allow liquid crystal molecules adjacent to the alignment film and the polymer layer to have determined initial inclinations even if the alignment film has not undergone an alignment treatment. In addition, if the polymer layer is formed by polymerizing monomers in the state that liquid crystal molecules have pretilt angles, for example, the polymer layer includes a structure allowing the liquid crystal molecules to have pretilt angles.

The liquid crystal material may have a positive anisotropy of dielectric constant or a negative anisotropy of dielectric constant. If a liquid crystal material with a negative anisotropy of dielectric constant is used and a polymer layer is formed to allow the liquid crystal molecules adjacent to the polymer layer to have vertical alignment, a liquid crystal display device of vertical alignment (VA) mode (MVA mode, fish bone PSA mode) with a high contrast ratio may be obtained. If a liquid crystal material with a positive anisotropy of dielectric constant is used, a liquid crystal display device of IPS mode, FFS mode, or TN mode may be obtained.

At least one kind of the radical polymerizable monomers is a compound including a structure which may generate radicals through self-cleavage reaction by light irradiation and two or more radical polymerizable groups. Using such a monomer enables short-time polymerization reaction without adding a polymerization initiator and causes no impurities derived from the polymerization initiator. This may prevent a decrease in a voltage holding ratio (VHR) in the liquid crystal layer, reducing deterioration of display quality. Using such a monomer also enables short-time light irradiation, which may prevent deterioration of components, enabling production of a reliable liquid crystal display device.

Configuration of the liquid crystal display device of the present invention is not particularly limited by other components as long as the components mentioned above are essentially included, and may further include, for example, peripheral circuits such as backlight unit and driver.

Preferred aspects of the liquid crystal display device of the present invention are specifically described in the following. Two or more of the preferred aspects shown in the following may be combined to serve as another preferred aspect of the liquid crystal display device of the present invention.

Examples of the radical polymerizable group include a (meth)acryloyloxy group, a (meth)acryloyl amino group, a vinyl group, and a vinyloxy group. A (meth)acryloyloxy group herein means an acryloyloxy group or a methacryloyloxy group, and a (meth)acryloyl amino group herein means an acryloyl amino group or a methacryloyl amino group.

At least one radical polymerizable monomer, including the structure which may generate radicals through self-cleavage reaction by light irradiation, preferably generates radicals by irradiation with light having a wavelength of 350 nm or longer. The radical polymerizable monomer, including the structure which may generate radicals through self-cleavage reaction by light irradiation, preferably generates radicals by irradiation with light having a wavelength of shorter than 400 nm. Irradiation with light having a wavelength of 350 nm or shorter may deteriorate structures in a panel to deteriorate the properties as a display. Thus, a self-cleavage photopolymerization initiator to which the polymerizing group is bonded preferably includes a structure which may generate radicals through self-cleavage reaction that is efficiently caused by irradiation with light having a wavelength of 350 nm or longer. Meanwhile, if the radical polymerizable monomer absorbs light with a 400 nm or longer wavelength, uncleaved photopolymerization initiator which is phase separated by polymerization will react in response to light irradiated by a backlight (cold cathode fluorescent tube or LED) for a display in normal use during operation of the display, which may reduce long-term reliability. Thus, the above compound is preferably a compound in which the polymerizing group is bonded to a photopolymerizable compound shows no or sufficiently low absorption of light at 400 nm or longer. This enables production of a liquid crystal display device with long-term high reliability.

The radical polymerizable monomer, for example, includes a structure in which polymerizing groups are bonded to a self-cleavage photopolymerization initiator that may generate radicals through self-cleavage reaction by light irradiation. Specific examples of the radical polymerizable monomer include monomers with a structure in which polymerizing groups or polymerizing group-containing functional groups are bonded to the molecular framework of a self-cleavage photopolymerization initiator such as 2,2-dimethoxy-1,2-diphenyl ethane-1-one (product name: IRGACURE 651), 1-hydroxy-cyclohexyl-phenyl-ketone (product name: IRGACURE 184), 2-hydroxy-2-methyl-1-phenyl-propane-1-one (product name: IRGACURE 1173), 1-[4-(2-hydroxy ethoxy)-phenyl]-2-hydroxy-2-methyl-1- propane-1-one (product name: IRGACURE 2959), 2-hydroxy-1-{4-[4-(2-hydroxy-2-methyl-propionyl)-benzyl]-phenyl}-2-methyl-propane-1-one (product name: IRGACURE 127), phenylglyoxylic acid methyl ester (product name: DAROCURMBF), 2-methyl-1-[4-(methylthio) phenyl]-2-morpholino propane-1-one (product name: IRGACURE 907), 2-benzyl-2-dimethylamino-1-(4-morpholino phenyl)-butanone-1 (product name: IRGACURE 369), 2-dimethylamino-2-(4-methyl-benzyl)-1-(4-morpholine-4-yl-phenyl)-butane-1-one (product name: IRGACURE 379), bis(2,4,6-trimethyl benzoyl)-phenylphosphine oxide (product name: IRGACURE 819), 2,4,6-trimethyl benzoyl-diphenyl-phosphine oxide (product name: DAROCURTPO), bis ($\eta^5$-2,4-cyclopentadiene-1-yl)-bis(2,6-difluoro-3-(1H-pyrrole-1-yl)-phenyl)titanium (product name: IRGACURE 784), 1,2-octanedione, 1-[4-(phenylthio)-, 2-(O-benzoyloxime)] (product name: IRGACUREOXE 01), ethanone, 1-[9-ethyl-6-(2-methyl benzoyl)-9H-carbazole-3-yl]-, 1-(O-acetyloxime) (product name: IRGACUREOXE 02), or 2-ethylhexyl-4-dimethylaminobenzoate (product name: DAROCUREHA).

The radical polymerizable monomer including a structure which generates radicals through self-cleavage reaction by light irradiation and two or more radical polymerizable groups is, in terms of drive conditions of the liquid crystal display device, preferably a self-cleavage photopolymerization initiator having an extinction coefficient of 20 ml/g·cm or less for light having a wavelength of 400 nm or longer. Specific examples of the radical polymerizable monomer include self-cleavage photopolymerization initiators with a structure in which polymerizing groups or polymerizing group-containing functional groups are bonded to the molecular framework of 2,2-dimethoxy-1,2-diphenyl ethane-1-one (product name: IRGACURE 651), 1-hydroxy-cyclohexyl-phenyl-ketone (product name: IRGACURE 184), 2-hydroxy-2-methyl-1-phenyl-propane-1-one (product name: IRGACURE 1173), 1-[4-(2-hydroxy ethoxy)-phenyl]-2-hydroxy-2-methyl-1-propane-1-one (product name: IRGACURE 2959), 2-hydroxy-1-{4-[4-(2-hydroxy-2-methyl-propionyl)-benzyl]-phenyl}-2-methyl-propane-1-one (product name: IRGACURE 127), phenylglyoxylic acid methyl ester (product name: DAROCURMBF), 2-methyl-1-[4-(methylthio) phenyl]-2-morpholino propane-1-one (product name: IRGACURE 907), ethanone, 1-[9-ethyl-6-(2-methyl benzoyl)-9H-carbazole-3-yl]-, 1-(0-acetyloxime) (product name: IRGACUREOXE 02), or 2-ethylhexyl-4-dimethylaminobenzoate (product name: DAROCUREHA).

Examples of the compound including a structure which may generate radicals through self-cleavage reaction by light irradiation and two or more radical polymerizable groups include compounds represented by the following chemical formula (1):

[Chem. 2]

(1)

wherein
$R^1$ represents a C1-C4 linear or branched alkyl or alkenyl group, or $Sp^3$-$P^3$;
$R^2$ represents a C1-C4 linear or branched alkyl or alkenyl group, or $Sp^4$-$P^4$;
$P^1$, $P^2$, $P^3$, and $P^4$ represent the same or different radical polymerizable groups, and the total number of the radical polymerizable groups is two or more;
$Sp^1$ represents a C1-C6 linear, branched, or cyclic alkylene, alkyleneoxy, or alkylene carbonyloxy group, or a direct bond, and when $m^1$ is 2 or more, the $Sp^1$s are the same as or different from each other;
$Sp^2$ represents a C1-C6 linear, branched, or cyclic alkylene, alkyleneoxy, or alkylene carbonyloxy group, or a direct bond, and when $m^2$ is 2 or more, the $Sp^2$s are the same as or different from each other;
$Sp^3$ represents a C1-C6 linear, branched, or cyclic alkylene, alkyleneoxy, or alkylene carbonyloxy group;
$Sp^4$ represents a C1-C6 linear, branched, or cyclic alkylene, alkyleneoxy, or alkylene carbonyloxy group;
$L^1$ represents a —F group, a —OH group, or a C1-C12 alkyl, alkenyl, or aralkyl group, the alkyl or alkenyl group may be linear or branched, and when $n^1$ is 2 or more, the $L^1$s are the same as or different from each other;
when two $L^1$s are independently bonded to respective two adjacent carbon atoms in an aromatic ring, the two $L^1$s may be bonded to each other to form a cyclic structure, and the two $L^1$s are the same as or different from each other, each representing a C1-C12 linear or branched alkylene or alkenylene group;
$L^2$ represents a —F group, a —OH group, or a C1-C12 alkyl, alkenyl, or aralkyl group, the alkyl or alkenyl group may be linear or branched, and when $n^2$ is 2 or more, the $L^2$s are the same as or different from each other;
when two $L^2$s are independently bonded to respective two adjacent carbon atoms in an aromatic ring, the two $L^2$s may be bonded to each other to form a cyclic structure, and the two $L^2$s are the same as or different from each other, each representing a C1-C12 linear or branched alkylene or alkenylene group;
one or more hydrogen atoms on the alkyl, alkenyl, alkylene, alkenylene, or aralkyl group in $L^1$ and $L^2$ may be substituted with a —F group or a —OH group;
one or more —$CH_2$— groups of the alkyl, alkenyl, alkylene, alkenylene, or aralkyl group in $L^1$ and $L^2$ may be independently substituted with a —O— group, a —S— group, a —NH— group, a —CO— group, a —COO— group, a —OCO— group, a —O—COO— group, a —OCH$_2$— group, a —CH$_2$O— group, a —SCH$_2$— group, a —CH$_2$S— group, a —N(CH$_3$)— group, a —N(C$_2$H$_5$)— group, a —N(C$_3$H$_7$)— group, a —N(C$_4$H$_9$)— group, a —CF$_2$O— group, a —OCF$_2$— group, a —CF$_2$S— group, a —SCF$_2$— group, a —N(CF$_3$)— group, a —CH$_2$CH$_2$— group, a —CF$_2$CH$_2$— group, a —CH$_2$CF$_2$— group, a —CF$_2$CF$_2$— group, a —CH=CH— group, a —CF=CF— group, a —C≡C— group, a —CH=CH—COO— group, a —OCO—CH=CH— group, a $Sp^1$-$P^1$ group, or a $Sp^2$-$P^2$ group as long as oxygen, sulfur, and nitrogen atoms are not adjacent to each other;
$m^1$ is an integer of 1 to 3;
$m^2$ is an integer of 0 to 3;
$n^1$ is an integer of 0 to 4;
$n^2$ is an integer of 0 to 4;
the total of $m^1$ and $n^1$ is an integer of 1 to 5;
the total of $m^2$ and $n^2$ is an integer of 0 to 5; and
the total of $m^1$ and $m^2$ is an integer of 1 to 6.

In other words, another aspect of the present invention is a liquid crystal display device including: a pair of substrates, at least one of the pair of substrates including an alignment film and a structure consisting of an organic insulating material, a polymer layer that is formed on the alignment film to control the alignment of liquid crystal molecules, and a liquid crystal layer containing a liquid crystal material, the liquid crystal layer being placed between the pair of substrates, wherein the polymer layer is formed by polymerization of one or more kinds of radical polymerizable monomers contained in the liquid crystal layer, and at least one kind of the radical polymerizable monomers is a compound represented by the chemical formula (1).

The $P^1$ and $P^2$ preferably represent the same or different (meth)acryloyloxy groups.

Specific examples of the compound represented by the chemical formula (1) include compounds represented by the following chemical formula (2):

[Chem. 3]

$$P^1-Sp^1 \cdots \begin{array}{c} R^3 \\ | \\ O \\ | \\ C \\ | \\ O \\ | \\ R^4 \end{array} \cdots Sp^2-P^2 \qquad (2)$$

wherein
$R^3$ represents a C1-C4 linear or branched alkyl or alkenyl group;
$R^4$ represents a C1-C4 linear or branched alkyl or alkenyl group;
$P^1$ and $P^2$ represent the same or different radical polymerizable groups;
$Sp^1$ represents a C1-C6 linear, branched, or cyclic alkylene, alkyleneoxy, or alkylene carbonyloxy group, or a direct bond; and
$Sp^2$ represents a C1-C6 linear, branched, or cyclic alkylene, alkyleneoxy, or alkylene carbonyloxy group, or a direct bond.

Specific examples of the compound represented by the chemical formula (2) include compounds represented by the following chemical formula (3):

[Chem. 4]

(3)

wherein $R^5$ and $R^6$ are the same as or different from each other, each representing a hydrogen atom or a methyl group.

The compounds represented by the chemical formulae (1) to (3) include structures of (i) generating radicals by irradiation with light having a wavelength of 350 nm or longer, (ii) generating radicals by irradiation with light having a wavelength of shorter than 400 nm, and (iii) having an extinction coefficient of 20 ml/g·cm or less for light having a wavelength of 400 nm or longer.

The polymer layer is formed by polymerization of further one or more kinds of radical polymerizable monomers including a ring structure and a monofunctional or polyfunctional polymerizable group. Examples of the further one or more kinds of radical polymerizable monomers including a ring structure and a monofunctional or polyfunctional polymerizable group are preferably a compound represented by the following chemical formula (4):

[Chem. 5]

$$P^5\text{-}Sp^5\text{-}R^8A^1\text{-}(Z\text{-}A^2)_n\text{-}R^7 \qquad (4)$$

wherein
$R^7$ represents a —$R^8$—$Sp^5$-$P^5$ group, a hydrogen atom, a halogen atom, a —CN group, a —$NO_2$ group, a —NCO group, a —NCS group, a —OCN group, a —SCN group, a —$SF_5$ group, or a C1-C18 linear or branched alkyl group;
$P^5$ represents a radical polymerizable group;
$Sp^5$ represents a C1-C6 linear, branched, or cyclic alkylene or alkyleneoxy group, or a direct bond;
a hydrogen atom in $R^7$ may be substituted with a fluorine or a chlorine atom;
a —$CH_2$— group in $R^7$ may be substituted with a —O— group, a —S— group, a —NH— group, a —CO— group, a —COO— group, a —OCO— group, a —O—COO— group, a —$OCH_2$— group, a —$CH_2O$— group, a —$SCH_2$— group, a —$CH_2S$— group, a —$N(CH_3)$— group, a —$N(C_2H_5)$— group, a —$N(C_3H_7)$— group, a —$N(C_4H_9)$— group, a —$CF_2O$— group, a —$OCF_2$— group, a —$CF_2S$— group, a —$SCF_2$— group, a —$N(CF_3)$— group, a —$CH_2CH_2$— group, a —$CF_2CH_2$— group, a —$CH_2CF_2$— group, a —$CF_2CF_2$— group, a —CH=CH— group, a —CF=CF— group, a —C≡C— group, a —CH=CH—COO— group, or a —OCO—CH=CH— group as long as oxygen and sulfur atoms are not adjacent to each other;
$R^8$ represents a —O— group, a —S— group, a —NH— group, a —CO— group, a —COO— group, a —OCO— group, a —O—COO— group, a —$OCH_2$— group, a —$CH_2O$— group, a —$SCH_2$— group, a —$CH_2S$— group, a —$N(CH_3)$— group, a —$N(C_2H_5)$— group, a —$N(C_3H_7)$— group, a —$N(C_4H_9)$— group, a —$CF_2O$— group, a —$OCF_2$— group, a —$CF_2S$— group, a —$SCF_2$— group, a —$N(CF_3)$— group, a —$CH_2CH_2$— group, a —$CF_2CH_2$— group, a —$CH_2CF_2$— group, a —$CF_2CF_2$— group, a —CH=CH— group, a —CF=CF— group, a —C≡C— group, a —CH=CH—COO— group, a —OCO—CH=CH— group, or a direct bond;
$A^1$ and $A^2$ are the same as or different from each other, each representing a 1,2-phenylene group, a 1,3-phenylene group, a 1,4-phenylene group, a naphthalene-1,4-diyl group, a naphthalene-1,5-diyl group, a naphthalene-2,6-diyl group, a 1,4-cyclohexylene group, a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, a 1,2,3,4-tetrahydronaphthalene-2,6-diyl group, an indane-1,3-diyl group, an indane-1,5-diyl group, an indane-2,5-diyl group, a phenanthrene-1,6-diyl group, a phenanthrene-1,8-diyl group, a phenanthrene-2,7-diyl group, a phenanthrene-3,6-diyl group, an anthracene-1,5-diyl group, an anthracene-1,8-diyl group, an anthracene-2,6-diyl group, or an anthracene-2,7-diyl group;
a —$CH_2$— group in $A^1$ and $A^2$ may be, unless they are adjacent to each other, substituted with a —O— group or a —S— group; one or more hydrogen atoms in $A^1$ and $A^2$ each may be substituted with a fluorine atom, a chlorine atom, a —CN group, or a C1-C6 alkyl, alkoxy, alkyl carbonyl, alkoxy carbonyl, or alkyl carbonyloxy group;

Z represents a —O— group, a —S— group, a —NH— group, a —CO— group, a —COO— group, a —OCO— group, a —O—COO— group, a —OCH$_2$— group, a —CH$_2$O— group, a —SCH$_2$— group, a —CH$_2$S— group, a —N(CH$_3$)— group, a —N(C$_2$H$_5$)— group, a —N(C$_3$H$_7$)— group, a —N(C$_4$H$_9$)— group, a —CF$_2$O— group, a —OCF$_2$— group, a —CF$_2$S— group, a —SCF$_2$— group, a —N(CF$_3$)— group, a —CH$_2$CH$_2$— group, a —CF$_2$CH$_2$— group, a —CH$_2$CF$_2$— group, a —CF$_2$CF$_2$— group, a —CH═CH— group, a —CF═CF— group, a —C≡C— group, a —CH═CH—COO— group, a —OCO—CH═CH— group, or a direct bond; and n is 0, 1, or 2.

Specific examples of the compound represented by the chemical formula (4) include compounds represented by the following chemical formulae (5-1) to (5-5):

[Chem. 6]

(5-1)

(5-2)

(5-3)

(5-4)

(5-5)

wherein P$^5$s are the same as or different from each other, each representing a radical polymerizable group.

The P$^5$s preferably are the same or different (meth)acryloyloxy groups.

The further one or more kinds of radical polymerizable monomers including a ring structure and a monofunctional or polyfunctional polymerizable group in the liquid crystal layer have a residual concentration after forming the polymer layer of preferably 0.05 wt % or lower of the whole composition constituting the liquid crystal layer. This enables sufficient reduction of image sticking.

At least one of the pair of substrates may include a first electrode and a second electrode, and at least one of the first electrode and the second electrode may be provided with slits. The slits may provide the alignment properties of a multi-domain mode under an applied voltage. The smallest portion of the slits has a width of preferably 2 μm or greater. Such a condition is preferred to provide sufficient effects of the slits.

The liquid crystal display device preferably further includes a pair of polarizing plates disposed in a cross-nicol state. The slits formed in at least one of the first electrode and the second electrode are preferably provided with a cross-shaped trunk part and branch parts, the branch parts each extending in a direction of about 45° relative to the trunk part. Polarization axes of the pair of polarizing plates each preferably overlap with the cross-shaped trunk part. This may provide a configuration with efficient transmittance and good viewing angle characteristic.

The liquid crystal display device preferably further includes a pair of polarizing plates disposed in a cross-nicol state. At least one of the first electrode and the second electrode is preferably provided with a cross-shaped trunk part and branch parts, the branch parts each extending in a direction of about 45° relative to the trunk part. Polarization axes of the pair of polarizing plates each preferably overlap with the cross-shaped trunk part. This may provide a configuration with efficient transmittance and good viewing angle characteristic.

Examples of the structure consisting of an organic insulating material include color filters. Color filters enable color display and typically contain organic insulating materials. The present invention may prevent deterioration of color filters.

The alignment film is preferably a photo-alignment film formed by irradiating a photo-alignment film material with light. This may separate a liquid crystal into multiple domains without other components such as dielectric protrusions, and may prevent a decrease in the transmittance.

Examples of the structure consisting of an organic insulating material include a sealing structure made of a photocurable resin, which seals a liquid crystal layer between the pair of substrates. Although the sealing structure may be made of a heat curable resin, a sealing structure made of a photocurable resin is better because sealing process may be performed at normal temperature and requires no treatment on the whole panel. Such a sealing structure typically contains an organic insulating material. The present invention may prevent deterioration of such a sealing structure.

At least one of the pair of substrates may include, as the structure consisting of an organic insulating material, a dielectric protrusion to control the alignment of the liquid crystal molecules that are adjacent to the dielectric protrusion. The dielectric protrusion may provide the alignment property of a multi-domain mode under an applied voltage. The present invention requires a suppressed amount of ultraviolet rays irradiation and thus causes no problem even when using such an organic material.

Examples of the structure consisting of an organic insulating material include an interlayer insulation film formed between a supporting substrate and the alignment film. The interlayer insulation film typically contains an organic photosensitive material such as a positive resist or negative resist. The present invention requires a suppressed amount of ultraviolet rays irradiation and thus causes no problem even when using such an organic material.

Advantageous Effects of Invention

The liquid crystal display device of the present invention contains a polymer layer providing the effects of alignment stability, and thereby can prevent defects such as display unevenness and image sticking.

DESCRIPTION OF EMBODIMENTS

The present invention will be mentioned in more detail referring to the drawings in the following embodiments, but is not limited to these embodiments.

The liquid crystal display device of the present invention may be used for display devices such as televisions, personal computers, mobile phones, digital signage, and information displays to exert excellent display properties.

Embodiment 1

Figure 1:
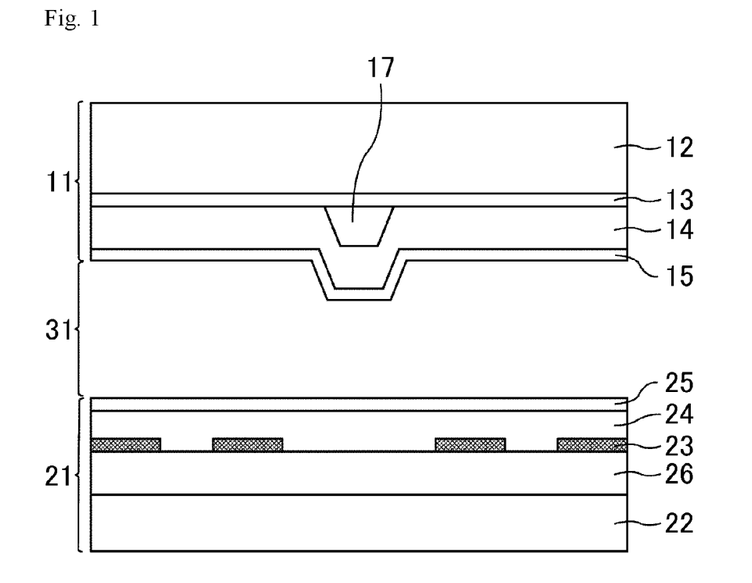
FIG. 1 is a schematic cross-sectional view of a liquid crystal display device according to Embodiment 1 after a PSA polymerization step.

FIG. 1 is a schematic cross-sectional view of a liquid crystal display device according to Embodiment 1 after a PSA polymerization step. As shown in FIG. 1, the liquid crystal display device according to Embodiment 1 includes a color filter substrate (first substrate) 11, an array substrate (second substrate) 21, and a liquid crystal layer 31 placed between a pair of substrates consisting of the color filter substrate 11 and array substrate 21.

The color filter substrate 11 includes an insulating transparent substrate (supporting substrate) 12 including a substance such as glass as a material. The color filter substrate 11 includes color filters, black matrix, a common electrode (second electrode) 13, and an alignment film 14 on the transparent substrate 12. The common electrode 13 is formed on the whole transparent substrate 12 regardless of the size of pixels.

The array substrate 21 includes an insulating transparent substrate (supporting substrate) 22 including a substance such as glass as a material. The array substrate 21 includes various wirings, a pixel electrode 23, TFTs (thin film transistors), and an alignment film 24 on the transparent substrate 22. As shown in FIG. 1, between the transparent substrate 22 and the pixel electrode 23, an interlayer insulation film 26 that consists of an organic insulating material is formed to electrically isolate the components such as the various wirings, the pixel electrode (first electrode), and the TFTs. The pixel electrode 23 is divided into a plurality of pieces according to the size of a pixel. The interlayer insulation film 26 is a structure that consists of an organic insulating material.

The alignment films 14 and 24 mainly contain a polymer compound such as polyimide, polyamic acid, poly amide, or polysiloxane.

As shown in FIG. 1, a dielectric protrusion (rib) 17 is formed in the color filter substrate 11, as a structure for controlling the alignment of liquid crystal molecules adjacent to the dielectric protrusion. Such a rib 17 may be formed by patterning by a photolithography method. Examples of the material for the rib 17 include photosensitive acrylic resins. In other words, the rib 17 is also a structure consisting of an organic insulating material of the present invention. The rib 17 is a component stretched in one direction to have a wall shape (a linear shape in a plan view) and may partially include one or more bends and branched sections. Forming such a structure for alignment control provides a multi-domain structure in which a liquid crystal layer is divided into multiple domains, whereby improving the viewing angle characteristic.

Before a polymerization step, the liquid crystal layer 31 contains a liquid crystal material and one or more kinds of radical polymerizable monomers. The liquid crystal material may have a positive anisotropy of dielectric constant or a negative anisotropy of dielectric constant. At least one kind of the radical polymerizable monomers is a compound including a structure which may generate radicals through self-cleavage reaction by light irradiation and two or more radical polymerizable groups.

The at least one kind of the radical polymerizable monomers generates radicals by self-cleavage reaction by irradiating the liquid crystal layer 31 with light, and thereby these radicals as active species successively initiate and proceed chain polymerization of the radical polymerizable groups of the radical polymerizable monomers. The formed polymer by the polymerization is phase separated to precipitate as polymer layers 15 and 25 on the substrate surfaces as shown in FIG. 1.

The one or more kinds of radical polymerizable monomers used in Embodiment 1 absorb light and generate radicals to initiate chain polymerization by themselves, and thus no further polymerization initiator is required. This polymerization initiator, which includes two or more functional groups, functions as a monomer to be polymerized, whereby greatly reducing the residual amount of the polymerization initiator in the liquid crystal layer 31.

In Embodiment 1, the rib 17 is formed in the color filter substrate 11. Thus, if the liquid crystal layer 31 is irradiated with light under a threshold or higher voltage during a PSA polymerization step, for example, the polymer layers 15 and 25 have a form allowing liquid crystal molecules to be aligned along with liquid crystal molecules tilted under a state with a threshold or higher voltage. As a result, the polymer layers 15 and 25 have a form separating the liquid crystal molecules into multiple domains with different initial pretilt angles even under no applied voltage.

Between the color filter substrate 11 and array substrate 21, a sealing agent is directly attached to the substrates 11 and 21 along their outer edges and thus seals the liquid crystal layer 31 therebetween. The sealing agent may be heat curable or photocurable, and is preferably a photocurable resin.

Examples of the monomer used in Embodiment 1, which generates radicals through self-cleavage by light irradiation, include a compound represented by the chemical formula (1), more specifically, a compound represented by the chemical formula (2) as the compound represented by the chemical formula (1), and still more specifically, a compound represented by the chemical formula (3) as the compound represented by the chemical formula (2).

The compound represented by the chemical formula (1) includes a structure which generates radicals by self-cleavage, and thus no further polymerization initiator is needed when the compound is mixed with a liquid crystal material, whereby enabling to efficiently initiate polymerization reaction only by light irradiation. Even if easily charged impurities that are presumably derived from polymerization initiators are generated, the polymerizing groups bonded to the compound form a polymer layer to cause phase separation, whereby reducing image sticking further than a polymer layer formed by a known polymerization initiator (e.g. a compound represented by the chemical formula (9)).

In Embodiment 1, the liquid crystal composition may contain other monomers. Examples of the other monomers include the compounds represented by the chemical formula (4), and more specifically, bifunctional monomers represented by the chemical formulae (5-1) to (5-5) as the compounds represented by the chemical formula (4).

The liquid crystal layer preferably has a residual concentration of the other monomers after forming a polymer layer of 0.05 wt % or lower of the whole composition constituting the liquid crystal layer. This may greatly prevent defects such as display unevenness and image sticking.

Figure 2:
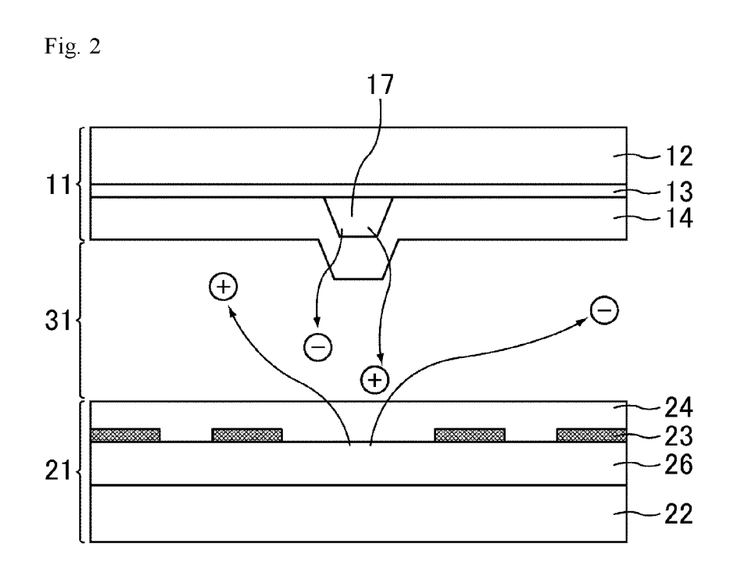
FIG. 2 is a schematic cross-sectional view of a liquid crystal display device with the same configuration as in Embodiment 1, showing the state of impurities being eluted from a structure consisting of an organic material by long-time ultraviolet rays irradiation.

FIG. 2 is a schematic cross-sectional view of a liquid crystal display device with the same configuration as in Embodiment 1, showing the state of impurities being eluted from a structure consisting of an organic material by long-time ultraviolet rays irradiation. A rib 17, an interlayer insulation film 26 and the like consisting of an organic insulating material, particularly tend to be deteriorated by ultraviolet rays irradiation, and thereby tend to cause impurities to be eluded into the liquid crystal layer 31.

In contrast, Embodiment 1, which uses the mentioned monomer to complete sufficient polymerization reaction by short-time ultraviolet rays irradiation, does not cause such a problem.

Next, other components used in the liquid crystal display device according to Embodiment 1 are described in detail.

Figure 3:
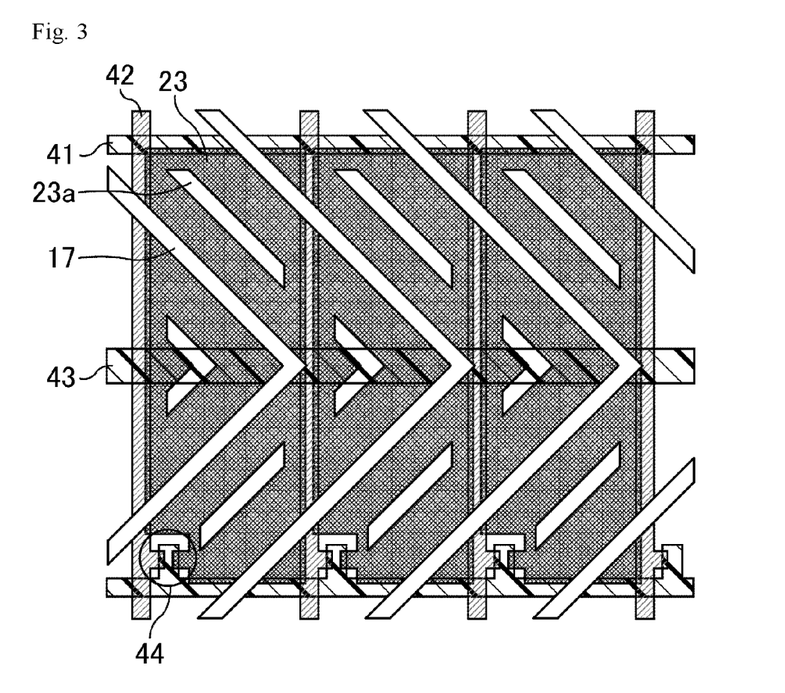
FIG. 3 is a schematic plan view of the liquid crystal display device according to Embodiment 1.

FIG. 3 is a schematic plan view of the liquid crystal display device according to Embodiment 1. The array substrate includes a plurality of gate signal lines 41 in parallel with each other, a plurality of source signal lines 42, and a plurality of auxiliary capacity (Cs) wirings 43 which are formed with an interlayer insulation film isolating these components. The gate signal lines 41 and the auxiliary capacity (Cs) wirings 43 are in parallel with each other and cross with the plurality of source signal lines 42. The gate signal lines 41 and the source signal lines 42 are connected to each of the electrodes contained in a thin film transistor (TFT) 44. The TFT 44 is a three-terminal field-effect transistor and includes a semiconductor layer and three electrodes: a gate electrode, a source electrode, and a drain electrode. The TFT 44 serves as a switching element controlling the driving of a pixel. Embodiment 1 may include a multi-drive structure, in which one gate wiring controls two subpixel electrodes, by dividing one pixel electrode 23 into multiple subpixel electrodes and forming a TFT in each subpixel electrode.

The pixel electrode 23 includes slits 23a, and a common electrode 13 includes ribs 17 consisting of an organic insulating material. The smallest portion of the slits 23a has a width of preferably 2 µm or greater. Under no applied voltage, most liquid crystal molecules, excepting a part thereof adjacent to the ribs 17, are aligned in a vertical direction. Under an applied voltage, the liquid crystal molecules tilt in a diagonal direction toward the ribs 17 and slits 23a.

The ribs 17 and slits 23a include linear shapes in a plan view and are arranged with regular intervals. Although the intervals may be partially different, all the intervals between each of the structures for alignment control 23a and 17 are preferably substantially equal. This may achieve favorable display with less display unevenness.

As shown in FIG. 3, the ribs 17 partially include bends to form v shapes in a plan view. In the whole view of the substrate, the ribs 17 form a zigzag shape. Thereby, the liquid crystal molecules adjacent to the ribs 17 may be controlled in a balanced manner to be aligned in four different directions in one pixel.

In the liquid crystal display device according to Embodiment 1, the array substrate 21, liquid crystal layer 31, and color filter substrate 11 are stacked in the stated order from the back side to the viewing side of the liquid crystal display device. A polarizing plate is provided on the back side of the array substrate 21. A polarizing plate is also provided on the viewing side of the color filter substrate 11. A pair of these polarizing plates has polarization axes in parallel with or orthogonal to each other. Each polarizing plate may include a retarder. The polarizing plates may be circularly polarizing plates.

The liquid crystal display device according to Embodiment 1 may be of transmissive type, reflective type, or transflective type. A transmissive type or transflective type liquid crystal display device according to Embodiment 1 further includes a back light unit. The back light unit is arranged at the back side of the array substrate 21 such that light permeates through the array substrate 21, the liquid crystal layer 31, and the color filter substrate 11 in the stated order. In a reflective type or transflective type liquid crystal display device, the array substrate 21 includes a reflector to reflect external light. At least in the region using reflected light for display, the polarizing plate of the color filter substrate 11 needs to be a circularly polarizing plate including a retarder called λ/4 retarder.

The liquid crystal display device according to Embodiment 1 may include a color filter-on-array structure in which the array substrate 21 includes color filters. The liquid crystal display device according to Embodiment 1 may be a monochrome display device. In this case, no color filters are necessary.

The liquid crystal layer 31 is filled with a liquid crystal material containing liquid crystal molecules that are aligned in prescribed directions under a certain voltage. The alignment of the liquid crystal molecules in the liquid crystal layer 31 is controlled under a threshold or higher voltage. Examples of the alignment mode of the liquid crystal molecules in Embodiment 1 include, but not limited to, TN mode, IPS mode, FFS mode, VA mode, and MVA mode.

In the liquid crystal display device according to Embodiment 1, a main body (e.g. mobile phone, monitor, liquid crystal TV (television), information display) is decomposed and subjected to chemical analyses such as NMR (Nuclear magnetic resonance), FT-IR (Fourier transform infrared spectroscopy), and MS (Mass Spectrometry) to analyze the monomer components in the polymer layer and to determine the proportion of the monomer components in the polymer layer and the mixing amount of monomers for forming the polymer layer contained in the liquid crystal layer.

Example 1

The following describes Example 1, in which liquid crystal cells to be included in the liquid crystal display device according to Embodiment 1 were actually produced. First, a pair of substrates each including a vertical alignment film was prepared. To one of the substrates, a photocurable sealing agent was applied. On the other substrate, ribs containing a photosensitive acryl resin were formed, and then beads were scattered. Then, the substrates were bonded together. Subsequently, between the pair of substrates, a liquid crystal composition containing a liquid crystal material with a negative anisotropy of dielectric constant and monomers for forming a polymer layer was injected. The resulting product was irradiated with a black light (FHF-32BLB, produced by TOSHIBA LIGHTING & TECHNOLOGY CORPORATION) for 20 minutes to form a polymer layer.

As for the monomers in the liquid crystal composition, monomers represented by the following chemical formulae (6) to (8) were appropriately combined and used. A compound represented by the following chemical formula (6) is a benzyl ketal bifunctional methacrylate monomer; a compound represented by the following chemical formula (7) is a biphenyl bifunctional methacrylate monomer; and a compound represented by the following chemical formula (8) is a phenanthrene bifunctional methacrylate monomer.

[Chem. 7]

(6)

[Chem. 8]

(7)

[Chem. 9]

(8)

In Example 1, three samples were prepared: Sample A contained a biphenyl monomer represented by the chemical formula (7) in an amount of 0.3 wt % of the whole liquid crystal composition; Sample B contained a biphenyl monomer represented by the chemical formula (7) in an amount of 0.3 wt % and a benzyl ketal monomer represented by the chemical formula (6) in an amount of 0.05 wt % of the whole liquid crystal composition; and Sample C contained a phenanthrene monomer represented by the chemical formula (8) in an amount of 0.6 wt % and a benzyl ketal monomer represented by the chemical formula (6) in an amount of 0.05 wt % of the whole liquid crystal composition.

Table 1 shows the measured result of the initial voltage holding ratio (initial VHR) and residual DC voltage of each sample. An initial VHR means the voltage holding ratio when a 1 V square wave is applied to a sample at the sample temperature of 70° C. A residual DC voltage means the voltage when a sample at the sample temperature of 45° C. is AC driven at 5.8 V and 30 Hz with an offset voltage of 2 V for 10 hours.

TABLE 1

|  | Initial VHR (%) | Residual DC voltage (mV) |
| --- | --- | --- |
| Sample A | 98.89 | 110 |
| Sample B | 99.11 | 20 |
| Sample C | 99.24 | 10 |

As shown in Table 1, the initial VHR of Sample A was 98.89%. In contrast, the initial VHR of Sample B containing a small amount of the benzyl ketal monomer represented by the chemical formula (6) was improved to 99.11%. Similarly, the initial VHR of Sample C containing a small amount of the monomer for initiating polymerization represented by the chemical formula (6) was improved to 99.24%.

Thus, using a benzyl ketal monomer contributed to keeping the initial VHR high. A high initial VHR indicates a small amount of mobile ions, in other words, residual monomers are hardly left in the liquid crystal layer.

Table 1 indicates the following: Sample A, which had a large residual DC voltage of 110 mV, may cause image sticking; and in contrast, Samples B and C, which contained a small amount of the benzyl ketal monomer represented by the chemical formula (6) and had a residual DC voltage of 20 mV and 10 mV, respectively, will hardly cause image sticking.

A low residual DC voltage indicates a small amount of mobile ions, in other words, similarly to the results of the VHR, residual monomers are hardly left in the liquid crystal layer.

Embodiment 2

Figure 4:
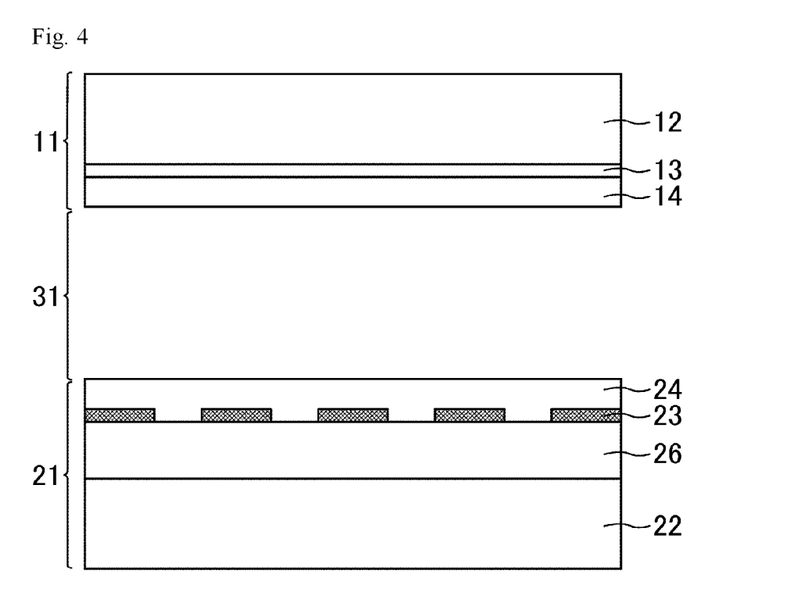
FIG. 4 is a schematic cross-sectional view of a liquid crystal display device according to Embodiment 2 after a PSA polymerization step.

Embodiment 1 gives an example of a liquid crystal display device without alignment treatment. Embodiment 2 gives a more detailed description of an embodiment of a liquid crystal display device with alignment treatment. FIG. 4 is a schematic cross-sectional view of a liquid crystal display device according to Embodiment 2 after a PSA polymerization step. In terms of improving the viewing angle characteristic and the response characteristic, one pixel was divided into multiple regions to form a multi-domain structure. Forming this structure requires alignment treatment such as rubbing treatment or photo-alignment treatment. In particular, photo-alignment treatment may reduce defects such as breakage of TFTs included in the array substrate 21. Examples of the photo-alignment film material include materials containing a compound that contains a photoreactive functional group such as a chalcone group, a coumarin group, a cinnamate group, an azobenzene group, a tran group, or a stilbene group. Examples of the light used for the photo-alignment treatment include polarized light, non-polarized light, and ion beam.

Particularly in IPS mode, FFS mode, or 4D-RTN mode, in which alignment films are subjected to alignment treatment to have orthogonal alignment directions to each other and one pixel is divided into 4 domains, the viewing angle may be greatly improved. In the 4D-RTN mode, especially, pretilt angles require highly precise control. The liquid crystal display device of the present invention, in which a polymer layer achieves stable pretilt angles, may provide sufficient alignment stability even in the 4D-RTN mode. The configurations of the IPS mode, FFS mode, and 4D-RTN mode may be easily formed by photo-alignment treatment.

Example 2

The following describes Example 2, in which liquid crystal cells to be included in the liquid crystal display device according to Embodiment 2 were actually produced. First, a pair of substrates, each of which included a photo-alignment film prepared by performing photo-alignment treatment on a cinnamate group-containing vertical alignment film material, was prepared. To one of the substrates, a photocurable sealing agent was applied. On the other substrate including a color filter layer, beads were scattered. Then, the substrates were bonded together. Subsequently, between the pair of substrates, a liquid crystal composition containing a liquid crystal material with a negative anisotropy of dielectric constant and monomers for forming a polymer layer was injected. The resulting product was irradiated with a black light (FHF-32BLB, produced by TOSHIBA LIGHTING & TECHNOLOGY CORPORATION) for 20 minutes to form a polymer layer.

As for the monomers in the liquid crystal composition, monomers represented by the chemical formulae (6) to (8) were appropriately combined and used. A compound represented by the chemical formula (6) is a benzyl ketal bifunctional methacrylate monomer; a compound represented by the chemical formula (7) is a biphenyl bifunctional methacrylate monomer; and a compound represented by the chemical formula (8) is a phenanthrene bifunctional methacrylate monomer.

In Example 2, three samples were prepared: Sample D contained the biphenyl monomer represented by the chemical formula (7) in an amount of 0.3 wt % of the whole liquid crystal composition; Sample E contained the biphenyl monomer represented by the chemical formula (7) in an amount of 0.3 wt % and the benzyl ketal monomer represented by the chemical formula (6) in an amount of 0.05 wt % of the whole liquid crystal composition; and Sample F contained the phenanthrene monomer represented by the chemical formula (8) in an amount of 0.6 wt % and the benzyl ketal monomer represented by the chemical formula (6) in an amount of 0.05 wt % of the whole liquid crystal composition.

Table 2 shows the measured result of the initial VHR and residual DC voltage of each sample. An initial VHR means the voltage holding ratio when a 1 V square wave is applied to a sample at the sample temperature of 70° C. A residual DC voltage means the voltage when a sample at the sample temperature of 45° C. is AC driven at 5.8 V and 30 Hz with an offset voltage of 2 V for 10 hours.

TABLE 2

|  | Initial VHR (%) | Residual DC voltage (mV) |
| --- | --- | --- |
| Sample D | 99.04 | 90 |
| Sample E | 99.25 | 10 |
| Sample F | 99.48 | 30 |

As shown in Table 2, the initial VHR of Sample D was 99.04%. In contrast, the initial VHR of Sample E containing a small amount of the benzyl ketal monomer represented by the chemical formula (6) was improved to 99.25%. Similarly, the initial VHR of Sample F containing a small amount of the monomer for initiating polymerization represented by chemical formula (6) was improved to 99.48%.

Thus, using a benzyl ketal monomer contributed to improving the initial VHR. A high initial VHR indicates a small amount of mobile ions, in other words, residual monomers are hardly left in the liquid crystal layer.

Table 2 indicates the following: Sample D, which had a large residual DC voltage of 90 mV, may cause image sticking; and in contrast, Samples E and F, which contained a small amount of the benzyl ketal monomer represented by the chemical formula (6) and had a residual DC voltage of 10 mV and 30 mV, respectively, will hardly cause image sticking.

A low residual DC voltage indicates a small amount of mobile ions, in other words, similarly to the results of the VHR, residual monomers are hardly left in the liquid crystal layer.

Example 3

The following describes Example 3, in which liquid crystal cells to be included in the liquid crystal display device according to Embodiment 2 were actually produced. First, a pair of substrates, each of which included a photo-alignment film prepared by performing photo-alignment treatment on a cinnamate group-containing horizontal alignment film material, was prepared. To one of the substrates including a pixel electrode and a common electrode each isolated by an interlayer insulation film, a photocurable sealing agent was applied. On the other substrate without electrodes, beads were scattered. Then, the substrates were bonded together. Subsequently, between the pair of substrates, a liquid crystal composition containing a liquid crystal material with a positive anisotropy of dielectric constant and monomers for forming a polymer layer was injected. The resulting product was irradiated with a black light (FHF-32BLB, produced by TOSHIBA LIGHTING & TECHNOLOGY CORPORATION) for 20 minutes to form a polymer layer.

As for the monomers in the liquid crystal composition, monomers represented by the chemical formulae (6) to (8) were appropriately combined and used. A compound represented by the chemical formula (6) is a benzyl ketal bifunctional methacrylate monomer; a compound represented by the chemical formula (7) is a biphenyl bifunctional methacrylate monomer; and a compound represented by the chemical formula (8) is a phenanthrene bifunctional methacrylate monomer.

In Example 3, three samples were prepared: Sample G contained the biphenyl monomer represented by the chemical formula (7) in an amount of 0.3 wt % of the whole liquid crystal composition; Sample H contained the biphenyl monomer represented by the chemical formula (7) in an amount of 0.3 wt % and the benzyl ketal monomer represented by the chemical formula (6) in an amount of 0.05 wt % of the whole liquid crystal composition; and Sample I contained the phenanthrene monomer represented by the chemical formula (8) in an amount of 0.6 wt % and the benzyl ketal monomer represented by the chemical formula (6) in an amount of 0.05 wt % of the whole liquid crystal composition.

Table 3 shows the measured result of the initial VHR and residual DC voltage of each sample. An initial VHR means the voltage holding ratio when a 1 V square wave is applied to a sample at the sample temperature of 70° C. A residual DC voltage means the voltage when a sample at the sample temperature of 45° C. is AC driven at 5.8 V and 30 Hz with an offset voltage of 2 V for 10 hours.

TABLE 3

|  | Initial VHR (%) | Residual DC voltage (mV) |
| --- | --- | --- |
| Sample G | 97.34 | 150 |
| Sample H | 98.55 | 20 |
| Sample I | 99.00 | 10 |

As shown in Table 3, the initial VHR of Sample G was 97.34%. In contrast, the initial VHR of Sample H containing a small amount of the benzyl ketal monomer represented by the chemical formula (6) was improved to 98.55%. Similarly, the initial VHR of Sample I containing a small amount of the monomer for initiating polymerization represented by the chemical formula (6) was improved to 99.00%.

Thus, using a benzyl ketal monomer contributed to improving the initial VHR. A high initial VHR indicates a small amount of mobile ions, in other words, residual monomers are hardly left in the liquid crystal layer.

Table 3 indicates the following: Sample G, which had a large residual DC voltage of 150 mV, may cause image sticking; and in contrast, Samples H and I, which contained a small amount of the benzyl ketal monomer represented by the chemical formula (6) and had a residual DC voltage of 20 mV and 10 mV, respectively, will hardly cause image sticking.

A low residual DC voltage indicates a small amount of mobile ions, in other words, similarly to the results of the VHR, residual monomers are hardly left in the liquid crystal layer.

Embodiment 3

Embodiment 1 gives an embodiment of controlling the alignment of liquid crystals by using ribs. Similarly, forming slits in the electrode (s) on one of the pair of substrates, for example, enables forming a polymer layer along with the alignment of liquid crystal molecules. Although this embodiment shows an example of forming slits only in a pixel electrode, similar slits may be formed only in a common electrode. Embodiment 3 has the same configuration as in Embodiment 1 or 2, except that slits are formed in the pixel electrode or on the common electrode. The width of the smallest portion of the slits is preferably 2 μm or greater.

Figure 5:
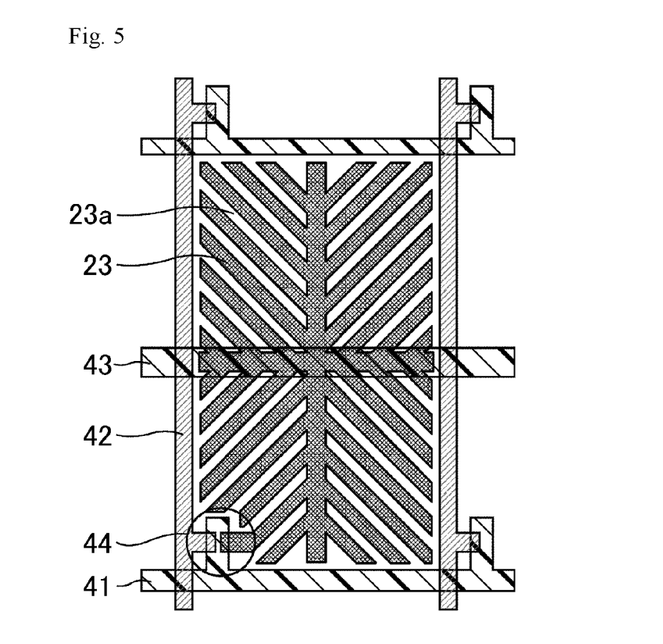
FIG. 5 is a schematic plan view of a liquid crystal display device according to Embodiment 3, in which a pixel electrode is formed to include a cross-shaped trunk part.
Figure 6:
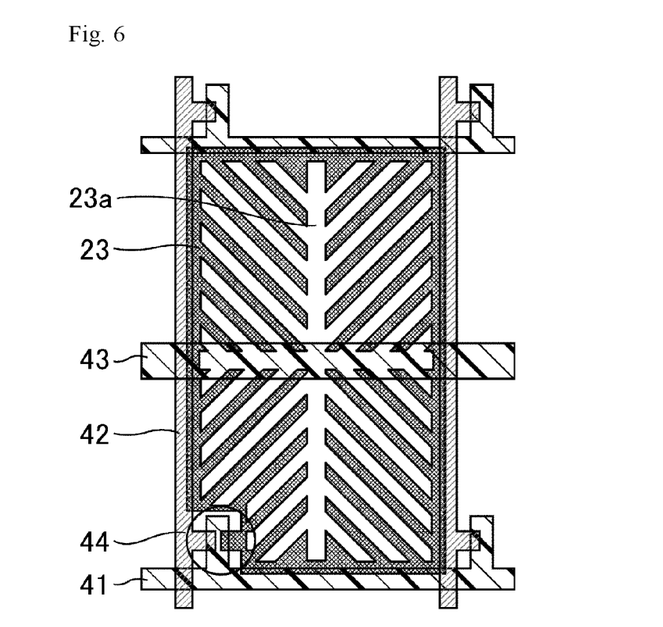
FIG. 6 is a schematic plan view of another liquid crystal display device according to Embodiment 3, in which slits are formed to include a cross-shaped trunk part.

FIGS. 5 and 6 each show a schematic plan view of a liquid crystal display device according to Embodiment 3. The liquid crystal display device according to Embodiment 3 includes the same configuration of wirings as that in Embodiment 1. FIG. 5 shows an example of a pattern in which a pixel electrode itself is formed to be provided with a cross-shaped trunk part and branch parts, the branch parts each extending in a direction of about 45° relative to the trunk part. FIG. 6 shows another example of a pattern in which slits are formed in the pixel electrode to be provided with a cross-shaped trunk part and a plurality of branch parts, the plurality of branch parts each extending in a direction of about 45° relative to the trunk part. Such a shape provided with a cross-shaped trunk part and a plurality of branch parts, the plurality of branch parts each extending in a direction of about 45° relative to the trunk part, is referred to as a "fish bone shape". Such a shape may be formed at the same time as forming the electrode by photolithography. In addition to the example in FIG. 5 including a fish bone-shaped pixel electrode 23, the example in FIG. 6 including slits 23a forming a fish bone shape in a pixel electrode 23 also includes a configuration with a plurality of slits 23a in a pixel electrode 23. As shown in FIGS. 5 and 6, the slits 23a in a plan view include linear shapes arranged with regular intervals. Although the intervals may be partially different, all the intervals between the slits 23a are preferably substantially equal. This may achieve favorable display with less display unevenness.

In the example in FIG. 5, the polarization axes of a pair of polarizing plates are disposed in a cross-nicol state, and each polarization axis is arranged to be overlapped with the cross-shaped trunk part of the pixel electrode, whereby exerting excellent viewing angle characteristic. Similarly in the example in FIG. 6, the polarization axes of a pair of polarizing plates are disposed in a cross-nicol state, and each polarization axis is arranged to be overlapped with the cross-shaped trunk part of the slits 23a in the pixel electrode, whereby exerting excellent viewing angle characteristic.

Example 4

The following describes Example 4, in which liquid crystal cells to be included in the liquid crystal display device according to Embodiment 3 were actually produced. First, a pair of substrates each including a vertical alignment film was prepared. To one of the substrates including an organic interlayer insulation film that contains a photosensitive material and a fish bone-shaped pixel electrode on the interlayer insulation film, a photocurable sealing agent was applied. On the other substrate including color filters and a common electrode, beads were scattered. Then, the substrates were bonded together. Subsequently, between the pair of substrates, a liquid crystal composition containing a liquid crystal material with a negative anisotropy of dielectric constant and monomers for forming a polymer layer was injected. The resulting product was irradiated with a black light (FHF-32BLB, produced by TOSHIBA LIGHTING & TECHNOLOGY CORPORATION) for 20 minutes to form a polymer layer.

As for the monomers in the liquid crystal composition, monomers represented by the chemical formulae (6) to (8) were appropriately combined and used. A compound represented by the chemical formula (6) is a benzyl ketal bifunctional methacrylate monomer; a compound represented by the chemical formula (7) is a biphenyl bifunctional methacrylate monomer; and a compound represented by the chemical formula (8) is a phenanthrene bifunctional methacrylate monomer.

In Example 4, three samples were prepared: Sample J contained the biphenyl monomer represented by the chemical formula (7) in an amount of 0.3 wt % of the whole liquid crystal composition; Sample K contained the biphenyl monomer represented by the chemical formula (7) in an amount of 0.3 wt % and the benzyl ketal monomer represented by the chemical formula (6) in an amount of 0.05 wt % of the whole liquid crystal composition; and Sample L contained the phenanthrene monomer represented by the chemical formula (8) in an amount of 0.6 wt % and the benzyl ketal monomer represented by the chemical formula (6) in an amount of 0.05 wt % of the whole liquid crystal composition.

Table 4 shows the measured result of the initial VHR and residual DC voltage of each sample. An initial VHR means the voltage holding ratio when a 1 V square wave is applied to a sample at the sample temperature of 70° C. A residual DC voltage means the voltage when a sample at the sample temperature of 45° C. is AC driven at 5.8 V and 30 Hz with an offset voltage of 2 V for 10 hours.

TABLE 4

|  | Initial VHR (%) | Residual DC voltage (mV) |
| --- | --- | --- |
| Sample J | 98.63 | 120 |
| Sample K | 99.22 | 30 |
| Sample L | 99.30 | 20 |

As shown in Table 4, the initial VHR of Sample J was 98.63%. In contrast, the initial VHR of Sample K containing a small amount of the benzyl ketal monomer represented by the chemical formula (6) was improved to 99.22%. Similarly, the initial VHR of Sample L containing a small amount of the monomer for initiating polymerization represented by the chemical formula (6) was improved to 99.30%.

Thus, using a benzyl ketal monomer contributed to improving the initial VHR. A high initial VHR indicates a small amount of mobile ions, in other words, residual monomers are hardly left in the liquid crystal layer.

Table 4 indicates the following: Sample J, which had a large residual DC voltage of 120 mV, may cause image sticking; and in contrast, Samples K and L, which contained a small amount of the benzyl ketal monomer represented by the chemical formula (6) and had a residual DC voltage of 30 mV and 20 mV, respectively, will hardly cause image sticking.

A low residual DC voltage indicates a small amount of mobile ions, in other words, similarly to the results of the VHR, residual monomers are hardly left in the liquid crystal layer.

The present application claims priority to Patent Application No. 2011-171138 filed in Japan on Aug. 4, 2011 under the Paris Convention and provisions of national law in a designated State, the entire contents of which are hereby incorporated by reference.

REFERENCE SIGNS LIST

11: color filter substrate
12, 22: supporting substrate
13: common electrode
14, 24: alignment film
15, 25: polymer layer
17: rib
21: array substrate
23: pixel electrode
23a: slits in pixel electrode
26: interlayer insulation film
31: liquid crystal layer
41: gate signal line
42: source signal line
43: Cs wiring
44: TFT

The invention claimed is:

1. A liquid crystal display device, comprising:
a pair of substrates, at least one of the pair of substrates including an alignment film and a structure consisting of an organic insulating material,
a polymer layer that is formed on the alignment film to control the alignment of liquid crystal molecules, and
a liquid crystal layer containing a liquid crystal material, the liquid crystal layer being placed between the pair of substrates,
wherein the polymer layer is formed by polymerization of one or more kinds of radical polymerizable monomers contained in the liquid crystal layer, and at least one kind of the radical polymerizable monomers is a compound including a structure which generates radicals through self-cleavage reaction by light irradiation and two or more radical polymerizable groups, and
wherein the structure consisting of an organic insulating material is either: (i) a dielectric protrusion to control the alignment of liquid crystal molecules that are adjacent to the dielectric protrusion; or (ii) an interlayer insulation film formed between a supporting substrate and the alignment film.

2. The liquid crystal display device according to claim 1, wherein at least one radical polymerizable monomer, including the structure which generates radicals through self-cleavage reaction by light irradiation, generates radicals by irradiation with light having a wavelength of 350 nm or longer.

3. The liquid crystal display device according to claim 1, wherein at least one radical polymerizable monomer, including the structure which generates radicals through self-cleavage reaction by light irradiation, generates radicals by irradiation with light having a wavelength of shorter than 400 nm.

4. The liquid crystal display device according to claim 1, wherein the radical polymerizable monomers have an extinction coefficient of 20 ml/g·cm or less for light having a wavelength of 400 nm or longer.

5. A liquid crystal display device, comprising:
a pair of substrates, at least one of the pair of substrates including an alignment film and a structure consisting of an organic insulating material,
a polymer layer that is formed on the alignment film to control the alignment of liquid crystal molecules, and
a liquid crystal layer containing a liquid crystal material, the liquid crystal layer being placed between the pair of substrates,
wherein the polymer layer is formed by polymerization of one or more kinds of radical polymerizable monomers contained in the liquid crystal layer, and at least one kind of the radical polymerizable monomers is a compound represented by the following chemical formula (1):

[Chem. 1]

(1)

wherein:
$R^1$ represents a C1-C4 linear or branched alkyl or alkenyl group, or $Sp^3$-$P^3$;
$R^2$ represents a C1-C4 linear or branched alkyl or alkenyl group, or $Sp^4$-$P^4$;
$P^1$, $P^2$, $P^3$, and $P^4$ represent the same or different radical polymerizable groups, and the total number of the radical polymerizable groups is two or more;
$Sp^1$ represents a C1-C6 linear, branched, or cyclic alkylene, alkyleneoxy, or alkylene carbonyloxy group, or a direct bond, and when $m^1$ is 2 or more, the $Sp^1$s are the same as or different from each other;
$Sp^2$ represents a C1-C6 linear, branched, or cyclic alkylene, alkyleneoxy, or alkylene carbonyloxy group, or a direct bond, and when $m^2$ is 2 or more, the $Sp^2$s are the same as or different from each other;
$Sp^3$ represents a C1-C6 linear, branched, or cyclic alkylene, alkyleneoxy, or alkylene carbonyloxy group;
$Sp^4$ represents a C1-C6 linear, branched, or cyclic alkylene, alkyleneoxy, or alkylene carbonyloxy group;
$L^1$ represents a —F group, a —OH group, or a C1-C12 alkyl, alkenyl, or aralkyl group, the alkyl or alkenyl group may be linear or branched, and when $n^1$ is 2 or more, the $L^1$s are the same as or different from each other;
when two $L^1$s are independently bonded to respective two adjacent carbon atoms in an aromatic ring, the two $L^1$s may be bonded to each other to form a cyclic structure, and the two $L^1$s are the same as or different from each other, each representing a C1-C12 linear or branched alkylene or alkenylene group;
$L^2$ represents a —F group, a —OH group, or a C1-C12 alkyl, alkenyl, or aralkyl group, the alkyl or alkenyl group may be linear or branched, and when $n^2$ is 2 or more, the $L^2$s are the same as or different from each other;
when two $L^2$s are independently bonded to respective two adjacent carbon atoms in an aromatic ring, the two $L^2$s may be bonded to each other to form a cyclic structure, and the two $L^2$s are the same as or different from each other, each representing a C1-C12 linear or branched alkylene or alkenylene group;
one or more hydrogen atoms on the alkyl, alkenyl, alkylene, alkenylene, or aralkyl group in $L^1$ and $L^2$ may be substituted with a —F group or a —OH group;

one or more —CH$_2$— groups of the alkyl, alkenyl, alkylene, alkenylene, or aralkyl group in L$^1$ and L$^2$ may be independently substituted with a —O— group, a —S— group, a —NH— group, a —CO— group, a —COO— group, a —OCO— group, a —O—COO— group, a —OCH$_2$— group, a —CH$_2$O— group, a —SCH$_2$— group, a —CH$_2$S— group, a —N(CH$_3$)— group, a —N(C$_2$H$_5$)— group, a —N(C$_3$H$_7$)— group, a —N(C$_4$H$_9$)— group, a —CF$_2$O— group, a —OCF$_2$— group, a —CF$_2$S— group, a —SCF$_2$— group, a —N(CF$_3$)— group, a —CH$_2$CH$_2$— group, a —CF$_2$CH$_2$— group, a —CH$_2$CF$_2$— group, a —CF$_2$CF$_2$— group, a —CH=CH— group, a —CF=CF— group, a —C≡C— group, a —CH=CH—COO— group, a —OCO—CH=CH— group, a Sp$^1$-P$^1$ group, or a Sp$^2$-P$^2$ group as long as oxygen, sulfur, and nitrogen atoms are not adjacent to each other;

m$^1$ is an integer of 1 to 3;
m$^2$ is an integer of 0 to 3;
n$^1$ is an integer of 0 to 4;
n$^2$ is an integer of 0 to 4;
the total of m$^1$ and n$^1$ is an integer of 1 to 5;
the total of m$^2$ and n$^2$ is an integer of 0 to 5; and
the total of m$^1$ and m$^2$ is an integer of 1 to 6, and
wherein the structure consisting of an organic insulating material is either: (i) a dielectric protrusion to control the alignment of liquid crystal molecules that are adjacent to the dielectric protrusion; or (ii) an interlayer insulation film formed between a supporting substrate and the alignment film.

6. The liquid crystal display device according to claim 1, wherein the alignment film is a photo-alignment film formed by irradiating a photo-alignment film material with light.

7. The liquid crystal display device according to claim 1, wherein at least one of the pair of substrates includes a first electrode and a second electrode, and at least one of the first electrode and the second electrode is provided with slits.

8. The liquid crystal display device according to claim 7, wherein the smallest portion of the slits has a width of 2 μm or greater.

9. The liquid crystal display device according to claim 7, further comprising a pair of polarizing plates disposed in a cross-nicol state, wherein at least one of the first electrode and the second electrode is provided with a cross-shaped trunk part and branch parts, the branch parts each extending in a direction of about 45° relative to the trunk part, and polarization axes of the pair of polarizing plates each overlap with the cross-shaped trunk part.

10. The liquid crystal display device according to claim 1, wherein the polymer layer is formed by polymerization of further one or more kinds of radical polymerizable monomers including a ring structure and a monofunctional or polyfunctional polymerizable group.

11. The liquid crystal display device according to claim 10, wherein the further one or more kinds of radical polymerizable monomers including a ring structure and a monofunctional or polyfunctional polymerizable group in the liquid crystal layer have a residual concentration after forming the polymer layer of 0.05 wt % or lower of the whole composition constituting the liquid crystal layer.

12. The liquid crystal display device according to claim 5, wherein the alignment film is a photo-alignment film formed by irradiating a photo-alignment film material with light.

13. The liquid crystal display device according to claim 5, wherein the compound represented by the chemical formula (1) generates radicals by irradiation with light having a wavelength of 350 nm or longer.

14. The liquid crystal display device according to claim 5, wherein the compound represented by the chemical formula (1) generates radicals by irradiation with light having a wavelength of shorter than 400 nm.

15. The liquid crystal display device according to claim 5, wherein the radical polymerizable monomers have an extinction coefficient of 20 ml/g·cm or less for light having a wavelength of 400 nm or longer.

16. The liquid crystal display device according to claim 5, wherein at least one of the pair of substrates includes a first electrode and a second electrode, and wherein at least one of the first electrode and the second electrode is provided with slits.

17. The liquid crystal display device according to claim 16, wherein the smallest portion of the slits has a width of 2 μm or greater.

18. The liquid crystal display device according to claim 16, further comprising a pair of polarizing plates disposed in a cross-nicol state, wherein at least one of the first electrode and the second electrode is provided with a cross-shaped trunk part and branch parts, the branch parts each extending in a direction of about 45° relative to the trunk part, and polarization axes of the pair of polarizing plates each overlap with the cross-shaped trunk part.

19. The liquid crystal display device according to claim 5, wherein the polymer layer is formed by polymerization of further one or more kinds of radical polymerizable monomers including a ring structure and a monofunctional or polyfunctional polymerizable group.

20. The liquid crystal display device according to claim 19, wherein the further one or more kinds of radical polymerizable monomers including a ring structure and a monofunctional or polyfunctional polymerizable group in the liquid crystal layer have a residual concentration after forming the polymer layer of 0.05 wt % or lower of the whole composition constituting the liquid crystal layer.

* * * * *